(12) United States Patent
Spaak et al.

(10) Patent No.: US 6,186,296 B1
(45) Date of Patent: Feb. 13, 2001

(54) SLEEVE AND MOBILE CONNECTION FOR ELECTRIC SUPPLY

(75) Inventors: Etienne Spaak; Claude Arnold, both of Strasbourg (FR)

(73) Assignee: Constructions Electriques Fels (Societe Anonyme), Illkirch Graffenstaden (FR)

( * ) Notice: Under 35 U.S.C. 154(b), the term of this patent shall be extended for 0 days.

(21) Appl. No.: 09/171,094

(22) PCT Filed: Feb. 9, 1998

(86) PCT No.: PCT/FR98/00247

§ 371 Date: Oct. 13, 1998

§ 102(e) Date: Oct. 13, 1998

(87) PCT Pub. No.: WO98/35414

PCT Pub. Date: Aug. 13, 1998

(30) Foreign Application Priority Data

Feb. 10, 1997 (FR) .................................................. 97 01640

(51) Int. Cl.[7] ...................................................... B60M 1/34
(52) U.S. Cl. .......................... 191/23 R; 191/33; 191/39; 191/40; 191/22 R; 191/23 A; 191/25
(58) Field of Search ..................... 191/33 R, 36, 191/39, 40, 22 R, 23 R, 23 A, 25

(56) References Cited

U.S. PATENT DOCUMENTS

| 413,294 | * | 10/1889 | Thomson | ............................ 191/25 |
| 448,838 | * | 3/1891 | Pocock | ................................. 191/25 |
| 2,696,533 | * | 12/1954 | Hammerly | ........................ 191/23 A |
| 3,189,679 | | 6/1965 | Scofield . | |
| 3,345,471 | | 10/1967 | Kilburg . | |
| 3,489,981 | * | 1/1970 | Corl et al. | ......................... 191/23 R |
| 3,561,317 | | 2/1971 | Rowell . | |

FOREIGN PATENT DOCUMENTS

| 585805 | * | 10/1959 | (CA) | ................................... 191/23 A |
| 681 649 | | 4/1993 | (CH) . | |
| 296 02 589 U | | 5/1996 | (DE) . | |
| 296 02 589 U1 | * | 5/1996 | (DE) | ............................... H02G/5/04 |
| 1.602.840 | | 2/1971 | (FR) . | |
| 2 264 412 | | 10/1975 | (FR) . | |
| 2 420 864 | | 10/1979 | (FR) . | |
| 2547465 | * | 12/1984 | (FR) | .............................. H01R/41/00 |
| 2 567 819 | | 1/1986 | (FR) . | |
| 61-295139 | * | 12/1986 | (JP) | .................................... 191/23 A |

* cited by examiner

Primary Examiner—S. Joseph Morano
Assistant Examiner—Frantz F. Jules
(74) Attorney, Agent, or Firm—Young & Thompson

(57) ABSTRACT

An electrical supply device with a conduit and movable electrical connector, includes conduit sections (1) in an insulating material, in which are disposed electrical conductors (2) interconnected at the level of the junctions of the conduit sections (1); joint covers (3) for connection of the conduit sections (1) insulating the electrical connections of the electrical conductors (2); at least one supply box (4) in line or at one end, by closure caps (5) for the ends of the electrical supply line formed by the conduit sections (1); suspensions (6) for the conduit sections (1); and at least one collector carriage (7) permitting directing the electrical current toward any fixed or movable receiver. Each conduit section (1) of insulating material is constituted in the shape of an insulating envelope, with an inverted U shape cross section, for reception of the electrical conductors (2) and for guidance of the collector carriage or carriages (7), this envelope having hollow wall structure and being provided in its internal section with a flexible anti-dirt joint (8).

10 Claims, 5 Drawing Sheets

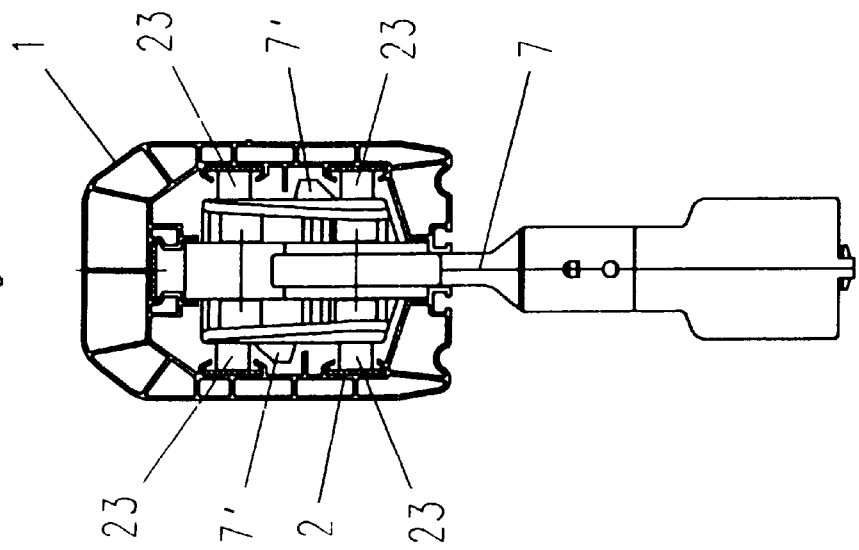
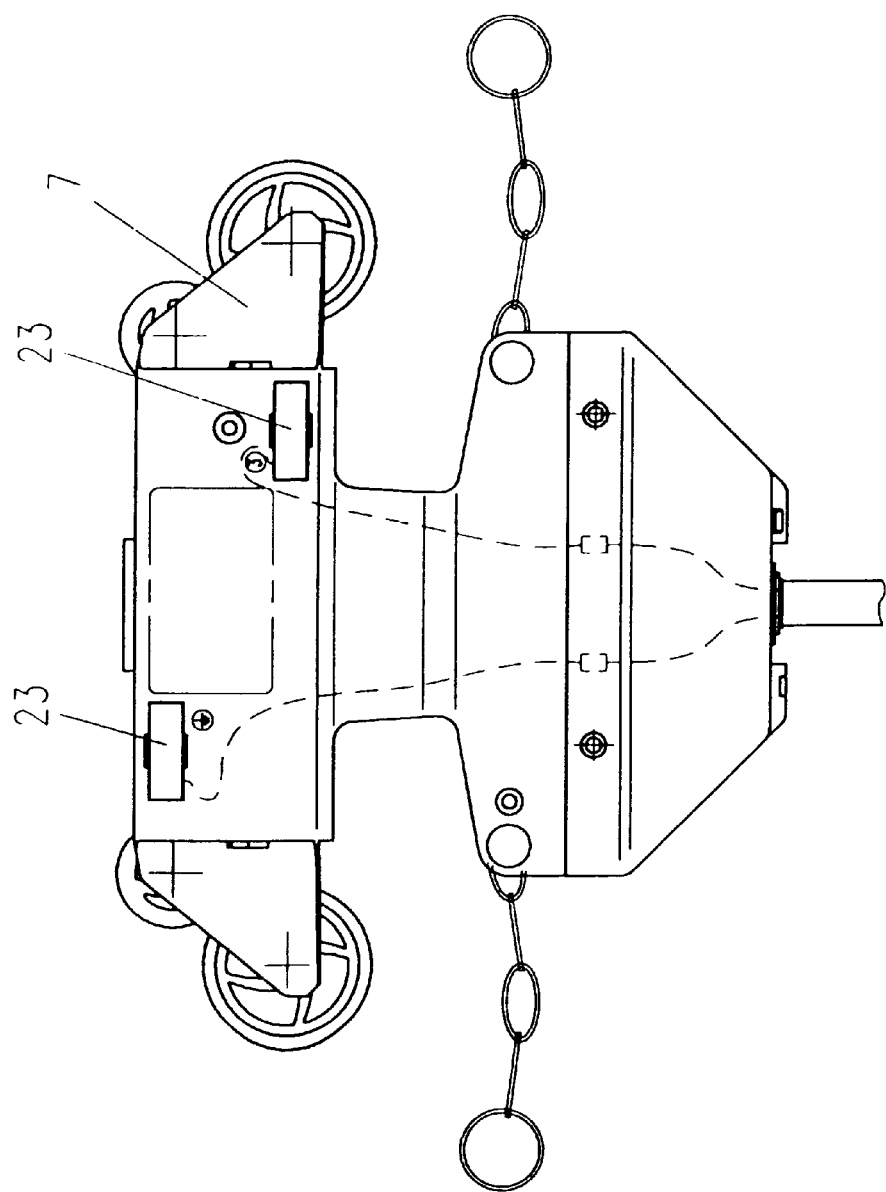

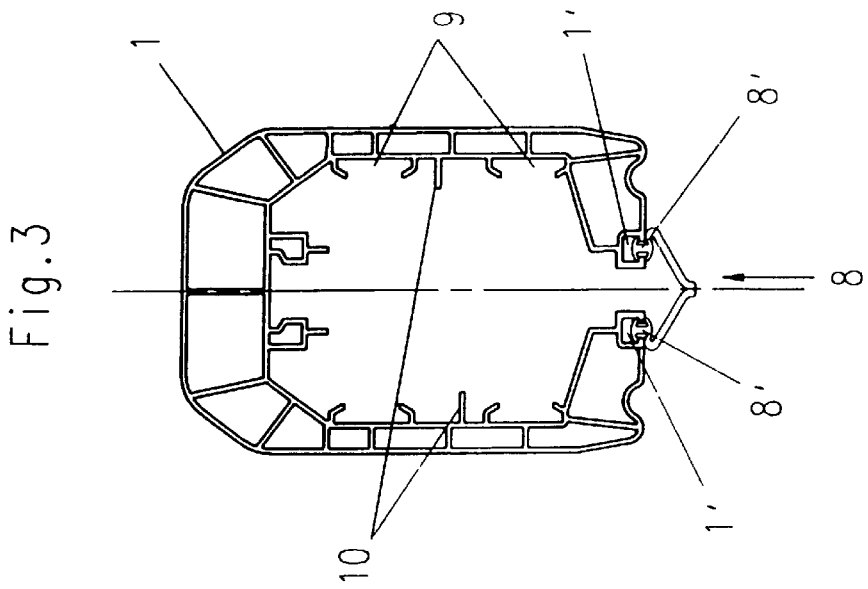
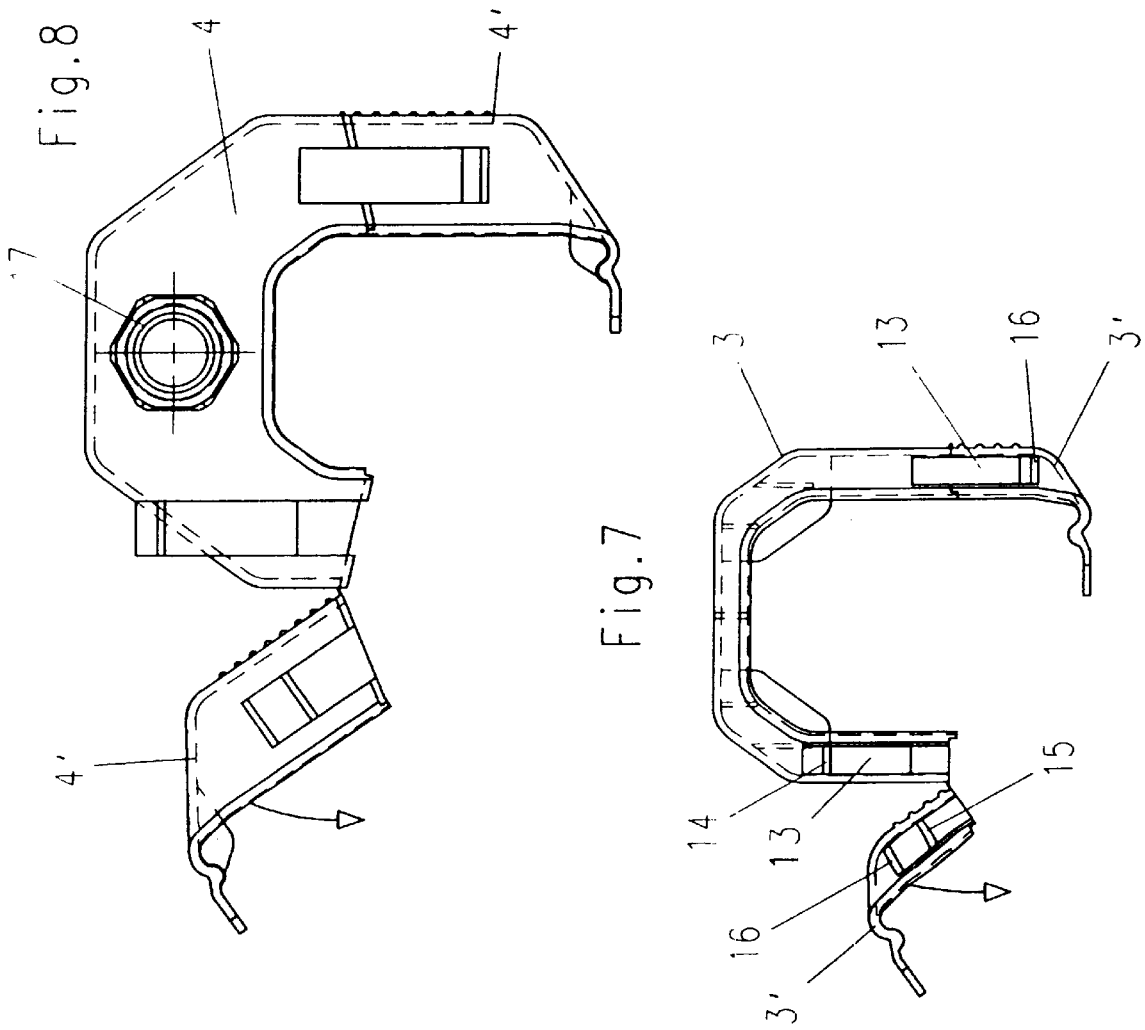

SLEEVE AND MOBILE CONNECTION FOR ELECTRIC SUPPLY

CROSS-REFERENCE TO RELATED APPLICATION

This application is the 35 USC 371 national stage of international application PCT/FR98/00247 filed on Feb. 9, 1998, which designated the United States of America.

FIELD OF THE INVENTION

The present invention relates to the field of the supply of electrical current to movable mechanisms such as gantries, monorails, hoists, small machine tools of the drill type, screwing machines, or the like, and other movable devices, and has for its object an electrical supply device with a conduit and movable electrical connector.

BACKGROUND OF THE INVENTION

Conduits which are adapted for any application requiring a movable low voltage electrical connector, for currents below 260 amperes and for speeds of movement less than 600 meters per minute, are generally in the form of profiles of synthetic material enclosing within their inner walls several electrical conductors and having standard lengths.

Existing conduits most often have right angle or oblique end sections. The electrical insulation of the junctions is ensured by means of joint covers. The electrical continuity is obtained either by the conductors being of single length within the conduits, or, when the conductors are premounted in the conduits, by means of connectors or a screw-nut system.

So as to permit good electrical conduction, there has been proposed in FR-A-2 420 864, a freely movable mounting for conductors in the conduit sections and providing the ends of said conductors with complementary shapes to form connection plates.

These known supply conduits however have the drawback of being of relatively great weight, whilst their rigidity, both transverse and longitudinal, is low. As a result, it is necessary to provide a larger number of supports so as to guarantee good retention without deformation of these conduits, as well as to avoid difficulties by preventing the insertion of fingers within the synthetic material profile.

Moreover, the existing joint covers at the end connections of the conduits are in the form of half shells assembled by bolting. Such an arrangement of these joint covers of course permits a correct insulation of the connections but however their emplacement or their removal requires a relatively long operation, which consequently increases the cost of the procedure.

Moreover, the suspensions of these conduits are most often comprised by several elements and give rise to the same mounting and unmounting drawbacks as the joint covers.

Finally, the collector carriages forming the movable electrical connectors are provided with contact brushes, whose securement on said carriages is ensured by screw means and by retention means coacting with these latter.

SUMMARY OF THE INVENTION

The present invention has for its object to overcome these drawbacks by providing an electrical supply device with a conduit and movable electrical connector, whose conduit has better longitudinal and transverse rigidity whilst being lightened relative to existing conduits and whose mounting of the other elements is greatly facilitated.

To this end, this supply device, which is essentially constituted by sections of conduit in an insulating material, in which are disposed electrical connectors interconnected at the level of the junctions of the conduit sections, by joint covers for connecting the conduit sections insulating the electrical connections of said electrical conductors, by at least one supply casing in line or at the end, by closure covers of the ends of the electrical supply line formed by the conduit sections, by suspensions for the conduit sections, and by at least one collector carriage permitting directing the electrical current toward any fixed or movable receiver, characterized in that each conduit section of insulating material is constituted by an insulating envelope of inverted U shape, for receiving the electrical conductors and for guiding the collector carriage or carriages, this envelope having hollow wall structure and being provided, as the case may be, in its lower portion with a flexible anti-dirt joint.

BRIEF DESCRIPTION OF THE DRAWINGS

The invention will be better understood from the following description, which relates to a preferred embodiment, given by way of non-limiting example, and explained with reference to the accompanying schematic drawings, in which:

FIG. 2 is a transverse cross section of the device at the level of a collector carriage;

FIG. 3 is a view in transverse cross section, on a larger scale, of a conduit section;

FIG. 4 is a side elevational view of a collector carriage;

FIG. 7 is a front elevational view of a joint cover for connection of the conduit sections;

FIG. 8 is a front elevational view of a connected supply box;

DETAILED DESCRIPTION OF THE INVENTION

Figure 1:
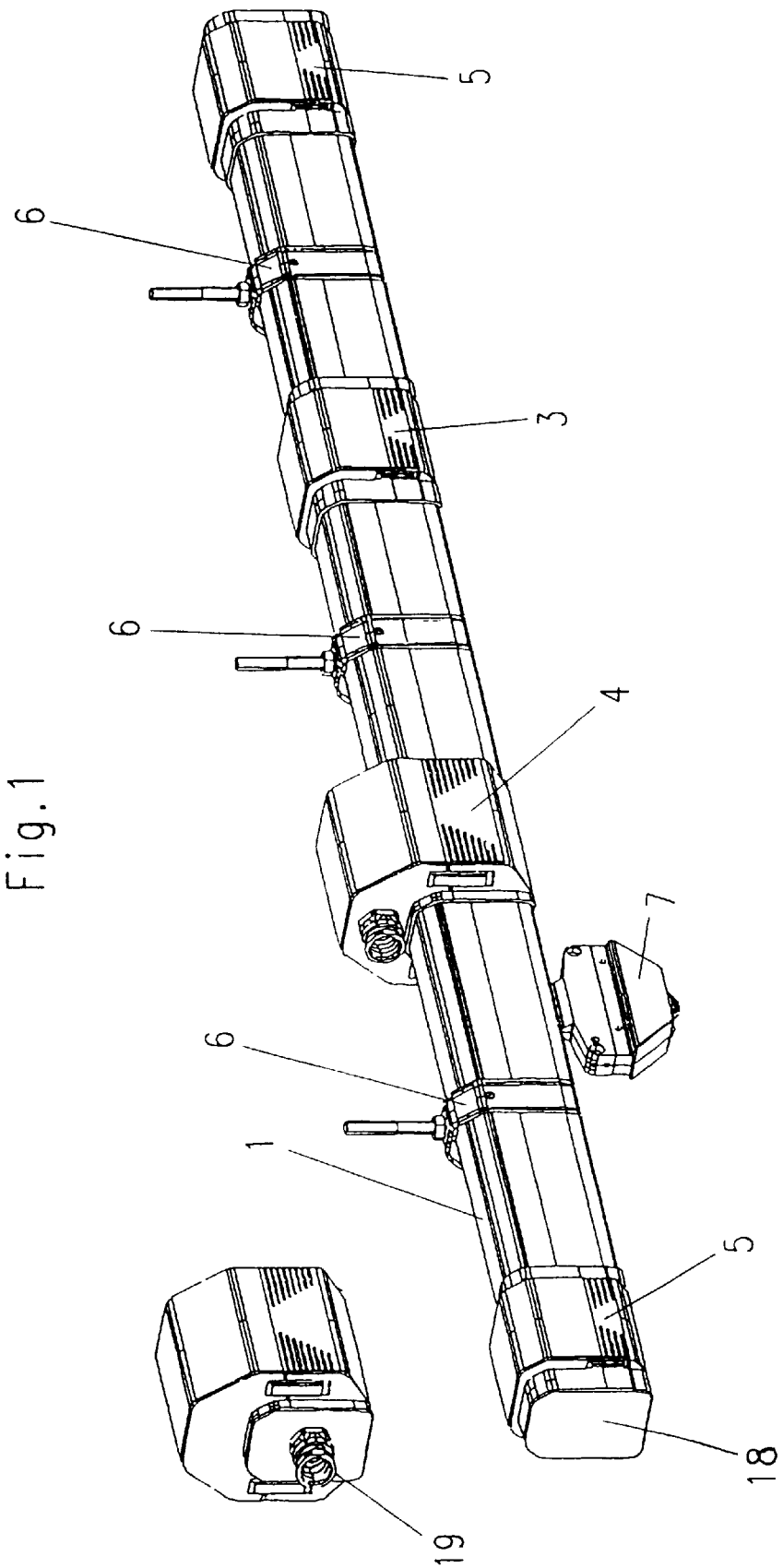
FIG. 1 is a perspective view of a device according to the invention.

FIG. 1 of the accompanying drawings shows an electrical supply device with a cover and movable electrical connector, which is essentially constituted by conduit sections 1 of an insulating material, in which are disposed electrical conductors 2 (FIG. 2) interconnected at the joints of the conduit sections, by joint covers 3 for connecting the conduit sections 1 insulating the electrical connections of said electrical conductors 2, by at least one connected supply box 4 or end, by closure caps 5 for the ends of the electrical supply line formed by the conduit sections 1, by suspensions 6 for the conduit sections 1, and by at least one collector carriage 7 permitting directing electrical current toward any fixed or movable receiver.

According to the invention, each conduit section 1 of insulating material is constituted by an insulating envelope, of inverted U section, for receiving electrical conductors 2

(FIG. 2) and for guiding the collector carriage or carriages 7, this envelope having hollow wall structure and being provided in its lower portion with grooves 1' permitting the reception of a flexible anti-dirt joint 8 (FIG. 3).

The flexible anti-dirt joint 8 is comprised by two symmetrical elements each provided with a profile 8' for securement in a groove 1' of corresponding shape provided at each end of the legs of the U forming the sections 1, these elements being constituted of a flexible synthetic material (FIG. 3). Thus, the constituent elements of the joint 8 are joined by their free edge in normal surface position and part when pressed against the longitudinal edges of the carriage or carriages 7, during passage of these latter, such that any penetration of dirt or other pollution is avoided.

The hollow structure of the walls of the envelopes forming each conduit section 1 permits reducing the weight of said envelope while improving the longitudinal and transverse rigidity thereof. Moreover, because of the reduction of weight, the cost of these sections 1 is correspondingly reduced. The longitudinal rigidity permits supporting the weight of the conductors 2, the weight of the carriage 7 and other accessories, whilst the high transverse rigidity permits satisfying the requirements of resistance to deformation by spacing the legs of the U shaped conduit section. Moreover, the junction between the base and the legs of the U forming the envelope is constituted by inclined walls, which also contributes to an improvement of rigidity.

The envelope forming each conduit section 1 is preferably provided on its internal surfaces, on the one hand on its lateral surfaces corresponding to the legs of the U, with longitudinal recesses 9 adapted for the electrical conductors 2 and, between said recesses 9, with ribs 10 for guiding the collector carriage or carriages 7 and, on the other hand, on the internal surface of its base and along the internal edge of the free ends of the legs of the U, with lateral guide surfaces for the collector carriage or carriages. As is shown more particularly in FIG. 2 of the appended drawings, the ribs 10 for guiding the collector carriage or carriages are offset from each other relative to a horizontal plane and each coact with a corresponding lateral abutment 7' of the carriage or carriages 7 by forming a guide. Thus, the emplacement of a collector carriage 7 can be carried out only in a single direction, which permits avoiding reversal of the direction of the phases or of the protective conductor, whilst contributing to the increase of the lines of escape between conductors.

Figure 10:
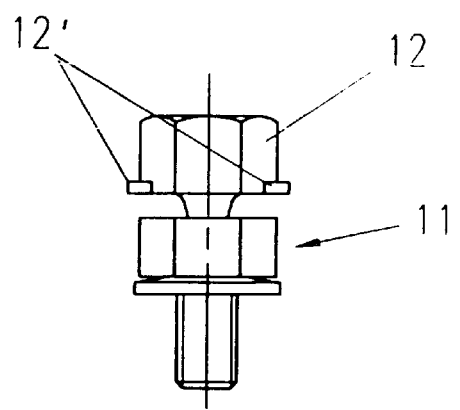
FIG. 10 is an elevational view of a connection screw of the electrical conductors.

According to another characteristic of the invention, the electrical connections of the electrical conductors 2 are ensured each by means of a screw-nut assembly coacting with holes in the ends of said conductors and whose connection screw 11 (FIG. 10) is provided with a head in two portions each comprising a polygon for manipulation and whose distal portion 12 of the screw-threaded shank, on the one hand, is self-breaking by connection with another portion of the head of a cylindrical portion of reduced section and, on the other hand, is provided with two lugs 12' forming an abutment for a manipulating key of the pipe or socket type, during mounting of the screw 11. Thus it is possible to grip the screw 11 only by means of the self-breaking portion 12. The breaking that takes place when the gripping couple becomes greater than the couple resisting it, which is a function of the material of the screw and of the diameter of the cylindrical portion of reduced section connecting the self-breaking portion 12 to the rest of the screw 11. This gripping couple is pre-established to obtain optimum contact pressure between the ends of the conductors 2.

The manipulating polygon provided on the remaining head portion of the screw 11, below the cylindrical portion of reduced cross section, permits easy disassembly of the screw 11 if needed.

The joint covers 3 for connection of the conduit sections 1 insulating the electrical connections of the electrical conductors 2 are each constituted, as shown in FIG. 7 of the accompanying drawings, by a monoblock element in the form of a housing of synthetic material, whose body encloses the upper portion of the ends of the conduit sections 1 to be connected and is provided with two lateral legs 3' secured to said body each by means of a flexible hinge, these legs being maintained in service position against the corresponding legs of the conduit sections 1 by means of blocking tongues 13 mounted on the body by means of flexible hinges and provided at their free end with a snap lug 14 adapted to coact with a corresponding recess 15 of the lateral legs 3'. These lateral legs 3' are moveover provided, in prolongation of the tongues 13, in the blocked closure position of the joint cover 3, with a guarantee rib 16 extending a very short distance from the corresponding end of said tongues 13.

These joint covers 3 can be mounted without a specific tool, their blocking in position being carried out by resilient engagement of the lug 14 in the recess 15. On the other hand, manual disassembly of the joint covers 3 is impossible, according to the standards in force, the guarantee rib 16 preventing access to the tongue 13 when the latter is closed. Disassembly of the tongue 13 thus cannot be carried out except with a screwdriver engaged below the free end of this latter. Moreover, the mounting and disassembly of such joint covers is more rapid and certain, because of the decrease in number of pieces to be handled, than the solutions now existing using several screw-nut assemblies.

The supply housings 4 (FIG. 8) in a line are each constituted by a monoblock element in the form of a housing analogous to that forming the joint covers 3, whose body has an enlargement and is provided on one of its surfaces with a stuffing box for passage of an electrical supply cable, two lateral legs 4' secured to said body, each by means of a flexible hinge, being maintained in service position against the corresponding legs of the conduit sections 1 by means of blocking tongues analogous to those of the joint covers 3.

In the case of supply at the end of a line, the boxes 4 without stuffings are associated with a supplemental end piece 18 provided with a stuffing box 19 and having the general shape of a square of which one side carries the stuffing box 19 and coacts shape-matingly with the corresponding opening of the monoblock element, the other side coacting with the predetermined opening between the lateral legs 4'.

The closure caps 5 at the ends of the electrical supply line are constituted by a square piece of a shape corresponding to that of the supplemental end piece 18 and are fixed on the ends by means of a joint cover 3 (FIG. 1).

Figure 9:
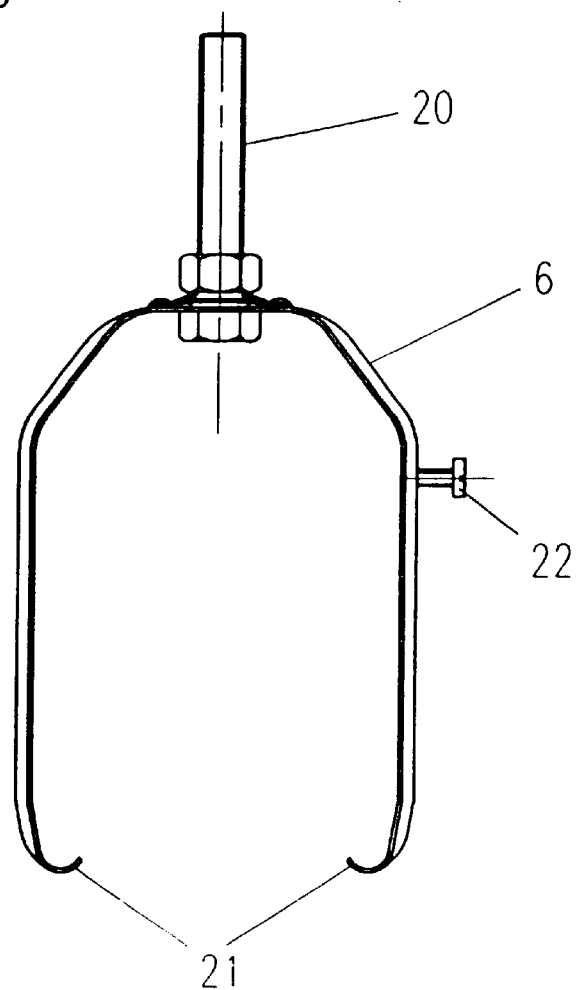
FIG. 9 is a front elevational view of a suspension for a conduit section.

The suspensions 6 for the conduit sections 1 are in the form of resiliently deformable monoblock stirrups, mounted by their center, with a degree of freedom in rotation, on a securement rod 20, the stirrups having an internal cross section corresponding to that of the conduit sections 1 and the end of their legs being provided with hooks 21 or the like adapted to hook resiliently into the ends of the U-shaped legs forming said conduit sections 1 (FIG. 9).

According to another characteristic of the invention, at least one suspension 6 is provided with anchoring means 22, in the form of a pressure screw, self-breaking or the like, passing through a leg of the stirrup forming the suspension 6 and bearing on or piercing the external wall of the corresponding leg of the conduit section 1. Thus, such an anchoring means 22 permits blocking the conduit in a predetermined place, so as to prevent it moving by creeping, upon successive expansions or vibrations.

The suspensions 6 permit supporting the weight of the supply line under good conditions, whilst offering low resistance to penetration, as well as opening without permanent deformation as a result of gripping in contact of the ends of the two branches thanks to their high transverse elasticity. Moreover, because of their mounting with a degree of freedom in rotation, they fulfil a self-aligning function during elastic hooking of the conduit. As a result, during engagement of the conduit, it is not necessary to move to the level of the suspension 6 to align it relative to the line or to secure it.

According to another characteristic of the invention, each collector carriage 7 (FIG. 4) is provided with brushes 23 retained in their recess 24 (FIGS. 5 and 6) by nipping by means of a resilient device 25 for guiding in said recess 24 and for electrical connection. Thanks to such a device 25, it is possible to disassemble and to assemble rapidly the brushes 23 for rapid maintenance which can be carried out without having to operate on the electric cable of the carriage 7.

Figure 5:
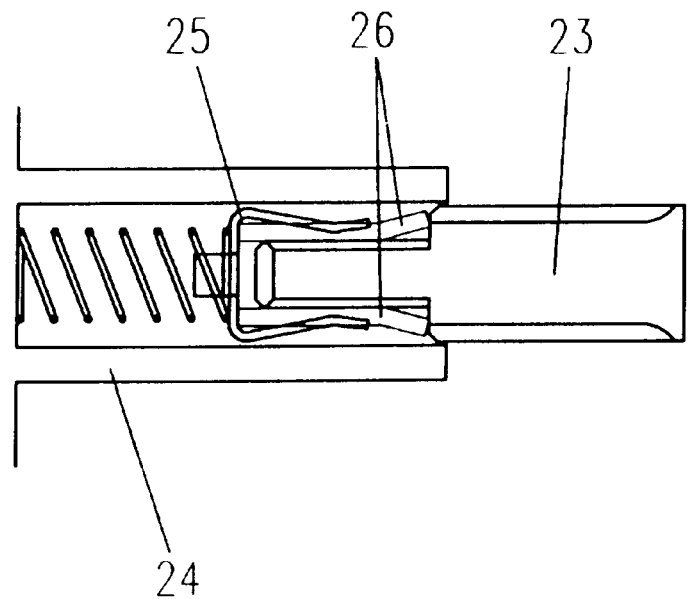
FIG. 5 is a side elevational view in cross section on a larger scale of a contact brush of the collector carriage.
Figure 6:
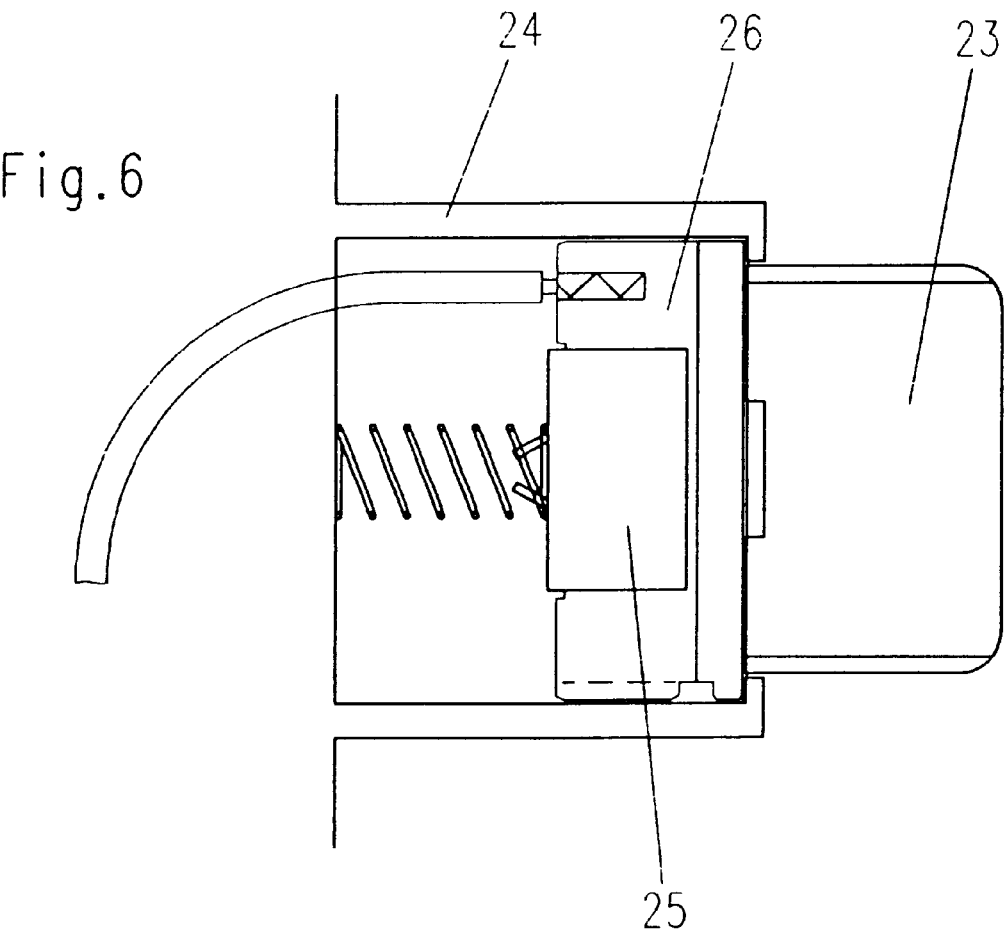
FIG. 6 is a plan and cross-sectional view of the brush according to FIG. 5.

The device 25 is constituted by two electrical connection plates 26 of the corresponding supply cable and by a screw gripper 25 with a blade surrounding said plates. FIGS. 5 and 6 of the accompanying drawings show mounting of the brush 23 in its corresponding position at the output of the collector carriage 7 outside the conduit 1.

The current collector brushes 23, which rub against the conductors 2 of the conduit 1 wear during operation, and their periodic replacement is carried out by withdrawing said brushes 23 by means of a tool such as a screwdriver. The emplacement of a new brush is carried out manually by simple insertion of its corresponding end into the resilient device 25. These two operations are carried out without touching the electrical cable of the carriage.

Thanks to the invention, it is possible to provide an electrical supply device with a conduit and a movable current collector, in which the supply line is lightened whilst having improved rigidity.

Moreover, the connections between conduit sections 1 are improved and can be carried out more rapidly at lower cost. The same is true for the electrical taps from the supply line thus instructed.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. An electrical supply device with a conduit and movable electrical connector, the device comprising:
    a plurality of conduit sections of insulating material, in which are disposed electrical conductors interconnected at junctions of the conduit sections;
    joint covers for connecting the conduit sections insulating the electrical connections of said electrical conductors;
    at least one supply box in line or at an end;
    closure caps for the ends of an electrical supply line formed by the conduit sections;
    suspensions for supporting the conduit sections;
    at least one collector carriage for taking off electrical current toward any fixed or movable receiver; each collector carriage being provided with brushes retained in a respective recess by gripping with a resilient device for guiding in said recess and for electrical connection;
    each conduit section of insulating material being in the form of an insulating envelope with an inverted U-shaped cross section comprising a base and two legs, for reception of the electrical conductors and for guidance of the collector carriage;
    said envelope having a hollow wall structure and being provided in its lower portion with a flexible anti-dirt joint, and on the internal surface of the base and along the internal edge of the free ends of the legs, with lateral guide surfaces for the collector carriage; and
    the junction between the base and the legs comprising inclined walls for improving rigidity.

2. The device according to claim 1, wherein the electrical conductors have ends, and each electrical connection is effected by a screw-nut assembly coacting with holes in the ends of said conductors; the screw-nut assembly comprising a screw-threaded shank and a connection screw provided with a head in two portions; each portion comprising a manipulating polygon; a distal portion of the screw-threaded shank being self-breaking by connection with another portion of the head by a cylindrical portion of reduced cross section, and being provided with two lugs forming an abutment for a manipulating key during mounting of the screw.

3. The device according to claim 1, wherein each joint cover comprises a monoblock element in the form of a housing body of synthetic material; said body covering the upper portion of the ends of the conduit sections and being provided with two lateral legs; each lateral leg being secured to the body by a flexible hinge; said lateral legs being maintained, in service position, against the corresponding legs of the conduit sections by blocking tongues mounted on the body by flexible hinges; said blocking tongues being provided at their free end with a snap plug adapted to coact with a corresponding recess in the lateral legs.

4. The device according to claim 3, wherein the lateral legs are provided in prolongation of the tongues, in a blocked closed position, with a guarantee rib extending a short distance from the corresponding end of said tongues.

5. The device according to claim 1, wherein each supply box comprises a monoblock element in the form of a housing body having an enlargement and being provided on one of its surfaces with a stuffing box for passage of an electrical supply cable; two lateral legs secured to said body, each by means of a flexible hinge, being maintained in service position against the corresponding legs of the conduit sections by blocking tongues.

6. The device according to claim 5, wherein a supply box at the end of the line is associated with a supplemental end piece having a general square shape and provided with a stuffing end box; one of the sides of said end piece carrying the stuffing end box and shape-matingly coacting with a corresponding opening of the mono-block element, the other side coacting with the predetermined opening between the lateral legs.

7. The device according to claim 1, wherein the closure caps for the ends of the electrical supply line comprise a square piece of a shape corresponding to that of a supplemental end piece and are fixed on the ends by a joint cover.

8. The device according to claim 1, wherein the suspensions for the conduit sections are in the form of resiliently deformable monoblock stirrups, mounted by their center, with a degree of freedom in rotation, on a securement rod; the stirrups having an internal cross section corresponding to that of the conduit sections and the end of the legs of the stirrups being provided with hooks adapted to hook resiliently into the end of the legs of the U-shaped cross section.

9. The device according to claim 8, wherein at least one suspension is provided with anchoring means in the form of a self-breaking pressure screw passing through a leg of the stirrup and bearing on or penetrating the external wall of the corresponding leg of the conduit section.

10. The device according to claim 1, wherein the resilient device comprises two plates for electrical connection of the corresponding supply cable and a spring nip with a blade surrounding said plates.

* * * * *